(12) United States Patent
Liu et al.

(10) Patent No.: US 11,384,165 B2
(45) Date of Patent: Jul. 12, 2022

(54) AQUEOUS DISPERSION OF MULTI-STAGE POLYMERIC PARTICLES AND PROCESS OF MAKING THE SAME

(71) Applicants: Dow Global Technologies LLC, Midland, MI (US); Rohm and Haas Company, Collegeville, PA (US)

(72) Inventors: Han Liu, Shanghai (CN); Dan Liu, Shanghai (CN); Qingwei Zhang, Shanghai (CN); Zhi Juan Gong, Shanghai (CN); Xiangting Dong, Shanghai (CN); Ling Li, Louyang (CN); Han Lv, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 26 days.

(21) Appl. No.: 16/972,773

(22) PCT Filed: Jul. 10, 2018

(86) PCT No.: PCT/CN2018/095098
§ 371 (c)(1),
(2) Date: Dec. 7, 2020

(87) PCT Pub. No.: WO2020/010509
PCT Pub. Date: Jan. 16, 2020

(65) Prior Publication Data
US 2021/0246232 A1    Aug. 12, 2021

(51) Int. Cl.
| | | |
|---|---|---|
| *C08F 12/08* | (2006.01) | |
| *C08F 2/26* | (2006.01) | |
| *C08F 220/56* | (2006.01) | |
| *C08F 2/38* | (2006.01) | |
| *C09D 131/02* | (2006.01) | |
| *C09D 133/08* | (2006.01) | |
| *C08F 220/18* | (2006.01) | |
| *C09D 5/02* | (2006.01) | |

(52) U.S. Cl.
CPC .......... *C08F 2/26* (2013.01); *C08F 2/38* (2013.01); *C08F 12/08* (2013.01); *C08F 220/1804* (2020.02); *C08F 220/56* (2013.01); *C09D 5/027* (2013.01); *C09D 131/02* (2013.01); *C09D 133/08* (2013.01)

(58) Field of Classification Search
CPC ...... C08F 12/08; C08F 2/26; C08F 220/1804; C08F 2/38; C08F 220/56; C09D 5/027; C09D 131/02; C09D 133/08
USPC .......................................... 524/801
See application file for complete search history.

(56) References Cited

U.S. PATENT DOCUMENTS

| | | |
|---|---|---|
| 5,530,056 A | 6/1996 | Farwaha et al. |
| 5,610,225 A | 3/1997 | Farwaha et al. |
| 6,270,905 B1 | 8/2001 | Swarup et al. |
| 2011/0034624 A1 | 2/2011 | Tseng et al. |
| 2017/0321059 A1* | 11/2017 | Yang ............... C09D 5/027 |

FOREIGN PATENT DOCUMENTS

| | | |
|---|---|---|
| CA | 2362919 | 8/2000 |
| CN | 102037032 | 4/2011 |
| CN | 04193914 | 12/2014 |
| CN | 104177555 | 12/2014 |
| EP | 2703434 | 3/2014 |
| JP | 5417600 | 2/2014 |

* cited by examiner

*Primary Examiner* — Kelechi C Egwim
(74) *Attorney, Agent, or Firm* — Karl E. Stauss; Cantor Colburn LLP

(57) ABSTRACT

A stable aqueous dispersion of multi-stage polymeric particles comprising a polymer and an oligomer, and an aqueous freeze-thaw stable coating composition comprising the aqueous dispersion providing coatings made therefrom with acceptable scrub resistance.

11 Claims, No Drawings

US 11,384,165 B2

AQUEOUS DISPERSION OF MULTI-STAGE POLYMERIC PARTICLES AND PROCESS OF MAKING THE SAME

FIELD OF THE INVENTION

The present invention relates to an aqueous dispersion of multi-stage polymeric particles and a process of making the same.

INTRODUCTION

Aqueous or waterborne coating compositions are becoming increasingly more important than solvent-based coating compositions for less environmental problems. The coating industry is always interested in developing coating compositions without or with substantially reduced or low VOCs, for example, no greater than 5 grams (g) of VOCs per liter of coating compositions. However, aqueous coating compositions, particularly low VOC coating compositions, usually suffer from a lack of freeze-thaw (F/T) stability during transportation and storage.

Recently developed anti-freeze agents having no contribution to VOCs, such as polyethylene glycol (PEG) and tristyrylphenol ethoxylate, can be used to improve F/T stability of coating compositions. For example, European Patent No. 2,703,434 discloses the use of alkoxylated tristyrylphenols or alkoxylated tributylphenols for improving freeze-thaw stability of latex dispersions and paint formulations. Unfortunately, the addition of these compounds usually hurts scrub resistance of the resulting coatings and significantly increases the cost.

Incorporation of methoxy polyethylene glycol methacrylate (MPEGMA) into synthesis of acrylic polymer binders may improve the F/T stability of coating compositions comprising thereof. However, when MPEGMA was incorporated into styrene acrylic polymer, it may cause binder sedimentation issue and hurt scrub resistance of coatings made therefrom dramatically.

Therefore, it is desirable to provide an aqueous polymer dispersion, particularly suitable for zero or low VOC, freeze-thaw stable, coating compositions, having no sedimentation issue, without compromising scrub resistance of coatings made therefrom.

SUMMARY OF THE INVENTION

The present invention provides a novel stable aqueous dispersion of multi-stage polymeric particles. The multi-stage polymeric particles comprise a polymer comprising structural units of a specific functional monomer mixture, and an oligomer comprising structural units of an alkoxylated (meth)acrylate, and the polymer and/or the oligomer comprises structural units of a vinyl aromatic. An aqueous coating composition comprising the aqueous dispersion of the present invention is freeze-thaw stable and provides coatings made therefrom with acceptable scrub resistance.

In a first aspect, the present invention is an aqueous dispersion of multi-stage polymeric particles comprising a polymer and an oligomer, wherein the polymer comprises,
(a1) structural units of a functional monomer mixture, comprising,
(i) 0.5% by weight or more of structural units of an α,β-ethylenically unsaturated carboxylic acid,
(ii) structural units of methyl acrylamide and/or sodium styrene sulfonate, and optionally
(iii) structural units of acrylamide;
wherein the total amount of (i), (ii), and (iii) is 2% by weight or more;
(a2) structural units of an alkyl ester of (meth)acrylic acid; and optionally,
(a3) structural units of a vinyl aromatic monomer;
wherein the oligomer has a weight average molecular weight of from 1,000 to 60,000 grams per mole (g/mol) and comprises:
(b1) 0.1% by weight or more of structural units of an alkoxylated (meth)acrylate having the structure of formula (I), $$\text{H}_2\text{C}=\underset{R_1}{\overset{}{\text{C}}}-\underset{}{\overset{O}{\text{C}}}-\text{O}-(\text{CH}_2\text{CH}_2\text{O})_{\overline{m}}-(\underset{R_4}{\overset{R_3}{\text{C}}}\text{CH}_2\text{O})_{\overline{n}}-R_2, \quad (I)$$

wherein $R_1$ is H or $CH_3$, $R_2$ is H or a $C_1$-$C_6$ alkyl group, $R_3$ and $R_4$ are each independently H or $CH_3$, m is an integer of from 8 to 50, and n is an integer of from 0 to 6; and optionally
(b2) structural units of a vinyl aromatic monomer;
wherein the structural units of the vinyl aromatic monomer in the multi-stage polymeric particles are present in a combined amount of 5% by weight or more; and
wherein the multi-stage polymeric particles comprise from 1% to 30% by weight of the oligomer; with % (percent) by weight values relative to the weight of the multi-stage polymeric particles.

In a second aspect, the present invention is a process of preparing an aqueous dispersion of multi-stage polymeric particles by multi-stage free-radical polymerization comprising at least one stage of polymerization to form a polymer and at least one stage of polymerization to form an oligomer in the presence of a chain transfer agent;

wherein the polymer comprises,
(a1) structural units of a functional monomer mixture, comprising,
(i) 0.5% by weight or more of structural units of an α,β-ethylenically unsaturated carboxylic acid,
(ii) structural units of methyl acrylamide and/or sodium styrene sulfonate, and optionally
(iii) structural units of acrylamide;
wherein the total amount of (i), (ii), and (iii) is 2% or more;
(a2) structural units of an alkyl ester of (meth)acrylic acid; and optionally,
(a3) structural units of a vinyl aromatic monomer; and
wherein the oligomer has a weight average molecular weight of from 1,000 to 60,000 g/mol and comprises:
(b1) 0.1% by weight or more of structural units of an alkoxylated (meth)acrylate having the structure of formula (I), $$\text{H}_2\text{C}=\underset{R_1}{\overset{}{\text{C}}}-\underset{}{\overset{O}{\text{C}}}-\text{O}-(\text{CH}_2\text{CH}_2\text{O})_{\overline{m}}-(\underset{R_4}{\overset{R_3}{\text{C}}}\text{CH}_2\text{O})_{\overline{n}}-R_2, \quad (I)$$

wherein $R_1$ is H or $CH_3$, $R_2$ is H or a $C_1$-$C_6$ alkyl group, $R_3$ and $R_4$ are each independently H or $CH_3$, m is an integer of from 8 to 50, and n is an integer of from 0 to 6; and optionally (b2) structural units of a vinyl aromatic monomer;

wherein the structural units of the vinyl aromatic monomer in the multi-stage polymeric particles are present in a combined amount of 5% by weight or more; and wherein the multi-stage polymeric particles comprise from 1% to 30% by weight of the oligomer; with percent by weight values relative to the weight of the multi-stage polymeric particles.

In a third aspect, the present invention is an aqueous coating composition comprising the aqueous dispersion of the first aspect.

DETAILED DESCRIPTION OF THE INVENTION

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" ($T_g$) in the present invention can be measured by various techniques including, for example, differential scanning calorimetry (DSC) or calculation by using a Fox equation. The particular values of Tg reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$; all temperatures being in K. The glass transition temperatures of the homopolymers may be found, for example, in "Polymer Handbook", edited by J. Brandrup and E. H. Immergut, Interscience Publishers.

As used herein, the term structural units, also known as polymerized units, of the named monomer refers to the remnant of the monomer after polymerization, or the monomer in polymerized form. For example, a structural unit of methyl methacrylate is as illustrated:

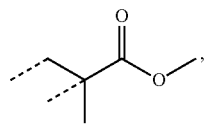

where the dotted lines represent the points of attachment of the structural unit to the polymer backbone.

"Aqueous" composition or dispersion herein means that particles dispersed in an aqueous medium. By "aqueous medium" herein is meant water and from zero to 30%, by weight based on the weight of the medium, of water-miscible compound(s) such as, for example, alcohols, glycols, glycol ethers, glycol esters, and the like.

By "multi-stage polymeric particles" herein is meant polymeric particles prepared by the sequential addition of two or more different monomer compositions. By "polymer" and "oligomer" herein are meant the polymer and oligomer having different compositions regardless of the order in which they were prepared in a multi-stage emulsion polymerization process.

The multi-stage polymeric particles in the aqueous dispersion of the present invention may comprise at least one polymer and at least one oligomer. The polymer and the oligomer are different from each other and formed in different stages of multi-stage free-radical polymerization in preparing the multi-stage polymeric particles.

The polymer in the multi-stage polymeric particles may comprise (a1) structural units of a functional monomer mixture. The structural units of the functional monomer mixture comprise (i) structural units of one or more α,β-ethylenically unsaturated carboxylic acids; (ii) structural units of methyl acrylamide, sodium styrene sulfonate, and mixtures thereof; and optionally (iii) structural units of acrylamide.

The α,β-ethylenically unsaturated carboxylic acids useful in the present invention can be acid-bearing monomers or monomers bearing an acid-forming group which yields or is subsequently convertible to, such an acid group (such as anhydride, (meth)acrylic anhydride, or maleic anhydride); or mixtures thereof. Examples of suitable α,β-ethylenically unsaturated carboxylic acids include acrylic acid, methacrylic acid, maleic acid, itaconic acid, crotonic acid, fumaric acid, and mixtures thereof. The polymer in the multi-stage polymeric particles may comprise, by weight based on the weight of the multi-stage polymeric particles, 0.5% or more, 0.6% or more, 0.7% or more, 0.8% or more, 0.9% or more, or even 1% or more, and at the same time, 5% or less, 4.5% or less, 4% or less, 3.5% or less, 3% or less, 2.5% or less, or even 2% or less, of structural units of the α,β-ethylenically unsaturated carboxylic acid. "Weight of the multi-stage polymeric particles" in the present invention refers to the dry or solids weight of the multi-stage polymeric particles.

The polymer in the multi-stage polymeric particles may comprise (ii) structural units of methyl acrylamide, sodium styrene sulfonate, and mixtures thereof. The polymer in the multi-stage polymeric particles may comprise 0.1% or more, 0.2% or more, 0.3% or more, 0.5% or more, 0.8% or more, 1% or more, 1.1% or more, 1.2% or more, or even 1.3% or more, and at the same time, 5% or less, 4.5% or less, 4% or less, 3.5% or less, 3% or less, 2.5% or less, or even 2% or less, of structural units of methyl acrylamide, sodium styrene sulfonate, and mixtures thereof.

The polymer in the multi-stage polymeric particles may optionally comprise (iii) structural units of acrylamide, for example, in an amount of from zero to 4%, from 0.1% to 3%, from 0.2% to 2%, or from 0.2% to 1%, by weight based on the weight of the multi-stage polymeric particles.

In one embodiment, the polymer comprises structural units of a combination of the α,β-ethylenically unsaturated carboxylic acids with methyl acrylamide, and optionally, acrylamide. In another embodiment, the polymer comprises structural units of a combination of the α,β-ethylenically unsaturated carboxylic acids with sodium styrene sulfonate, and optionally, acrylamide. In further embodiment, the polymer comprises structural units of a combination of the α,β-ethylenically unsaturated carboxylic acids with sodium styrene sulfonate and methyl acrylamide, and optionally, acrylamide.

The total amount of (i), (ii) and (iii) above may be, by weight based on the weight of the multi-stage polymeric particles, in an amount of 2% or more, for example, 2.1% or more, 2.2% or more, or even 2.3% or more, and at the same time, 5% or less, 4.5% or less, 4% or less, 3.5% or less, or even 3% or less.

The polymer in the multi-stage polymeric particles may also comprise (a2) structural units of one or more alkyl esters of (meth)acrylic acids. The alkyl esters of (meth)acrylic acids can be $C_1$-$C_{25}$-alkyl, $C_1$-$C_{22}$-alkyl, $C_1$-$C_{12}$-alkyl, or $C_4$-$C_{10}$-alkyl esters of (meth)acrylic acids. Examples of suitable alkyl esters of (meth)acrylic acids include methyl acrylate, methyl methacrylate, ethyl acrylate, butyl acrylate, butyl methacrylate, 2-ethylhexyl acrylate, iso-butyl (meth)acrylate, hexyl (meth)acrylate, lauryl (meth) acrylate, stearyl (meth)acrylate, cyclohexyl (meth)acrylate, benzyl (meth)acrylate, oleyl (meth)acrylate, palmityl (meth) acrylate, nonyl (meth)acrylate, decyl (meth)acrylate, dodecyl (meth)acrylate, pentadecyl (meth) acrylate, hexadecyl (meth)acrylate, octadecyl (meth)acrylate; and mixtures thereof. Preferred alkyl esters of (meth)acrylic acids are selected from the group consisting of methyl methacrylate, ethyl acrylate, butyl methacrylate, butyl acrylate, and 2-ethylhexyl acrylate. The polymer may comprise, by weight based on the weight of the multi-stage polymeric particles, from 10% to 80%, from 15% to 70%, from 20% to 60%, of structural units of the alkyl ester of (meth)acrylic acids.

The polymer in the multi-stage polymeric particles may further comprise (a3) structural units of one or more vinyl aromatic monomers. Suitable vinyl aromatic monomers may include, for example, styrene, substituted styrene including butylstryene, methylstyrene, p-methoxystyrene, and mixtures thereof. Preferred vinyl aromatic monomers is styrene.

The polymer in the multi-stage polymeric particles may further include (a4) structural units of one or more phosphorous-containing acid monomers and salts thereof. Examples of suitable phosphorous-containing acid monomers and salts thereof include phosphoalkyl (meth)acrylates such as phosphoethyl (meth)acrylate, phosphopropyl (meth) acrylate, phosphobutyl (meth)acrylate, salts thereof, and mixtures thereof; $CH_2=C(R^1)-C(O)-O-(R^2O)_q-P(O)(OH)_2$, wherein $R^1$=H or $CH_3$, $R^2$=alkyl, and q=1-10, such as SIPOMER PAM-100, SIPOMER PAM-200, and SIPOMER PAM-300 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. The polymer may comprise, by weight based on the weight of the multi-stage polymeric particles, from zero to 5%, from 0.01% to 4%, from 0.05% to 3%, or from 0.1% to 2%, of structural units of the phosphorous-containing acid monomers and salts thereof.

The polymer in the multi-stage polymeric particles may also comprise structural units of one or more alkoxylated (meth)acrylates, which can be selected from the same group as described in the oligomer section below. The polymer may comprise, by weight based on the weight of the multi-stage polymeric particles, from 0 to 5%, from 0.1% to 4%, from 0.5% to 3%, or from 1% to 2%, of structural units of the alkoxylated (meth)acrylate.

The polymer in the multi-stage polymeric particles may comprise structural units of monomers comprising the alkyl esters of (meth)acrylic acids, the vinyl aromatic monomer such as styrene, the α,β-ethylenically unsaturated carboxylic acid, methyl acrylamide, and optionally the phosphorous-containing acid monomers and salts thereof.

The polymer in the multi-stage polymeric particles may comprise structural units of monomers comprising the alkyl esters of (meth)acrylic acids, the vinyl aromatic monomer such as styrene, the α,β-ethylenically unsaturated carboxylic acid, sodium styrene sulfonate, and optionally the phosphorous-containing acid monomers and salts thereof.

In some embodiments, the polymer in the multi-stage polymeric particles comprise, from 1% to 3% of structural units of the α,β-ethylenically unsaturated carboxylic acid, from 1% to 5% of structural units of methyl acrylamide and/or sodium styrene sulfonate, from zero to 3% of structural units of acrylamide;

from 20% to 70% of structural units of the alkyl ester of (meth)acrylic acids, from 20% to 70% of structural units of styrene, and from zero to 2% of structural units of the phosphorous-containing acid monomers and salts thereof.

The polymer in the multi-stage polymeric particles has a higher weight average molecular weight than the oligomer, for example, in the range of from 100,000 to 1,000,000 g/mol, from 110,000 to 800,000 g/mol, from 120,000 to 700,000 g/mol, from 150,000 to 600,000 g/mol, from 180,000 to 500,000 g/mol, from 200,000 to 400,000 g/mol, or from 210,000 to 380,000 g/mol, as determined by Gel Permeation Chromatography (GPC) analysis described in the Examples section below.

The multi-stage polymeric particles useful in the present invention further comprise one or more oligomers. The oligomer herein refers to a polymer having a weight average molecular weight of from 1,000 to 60,000 g/mol. The weight average molecular weight of the oligomer may be 1,500 g/mol or more, 2,000 g/mol or more, 3,000 g/mol or more, 4,000 g/mol or more, 5,000 g/mol or more, 6,000 g/mol or more, 7,000 g/mol or more, 8,000 g/mol or more, 9,000 g/mol or more, or even 10,000 g/mol or more, and at the same time, 60,000 g/mol or less, 55,000 g/mol or less, 50,000 g/mol or less, 45,000 g/mol or less, 42,000 g/mol or less, 40,000 g/mol or less, 38,000 g/mol or less, 35,000 g/mol or less, 32,000 g/mol or less, 30,000 g/mol or less, 28,000 g/mol or less, 25,000 g/mol or less, or even 20,000 g/mol or less, as determined by GPC analysis described in the Examples section below.

The oligomer in the multi-stage polymeric particles may comprise (b1) structural units of one or more alkoxylated (meth)acrylates. The alkoxylated (meth)acrylates useful in the present invention may have the structure of formula (I),

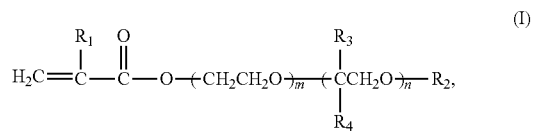

(I)

wherein $R_1$ is H or $CH_3$, $R_2$ is H or a $C_1$-$C_6$ alkyl group, $R_3$ and $R_4$ are each independently H or $CH_3$, m is an integer of from 8 to 50, and n is an integer of from 0 to 6.

When the alkoxylated (meth)acrylate comprises a combination of ethylene oxide (—$CH_2CH_2O$—) units, propylene oxide(—$CH(CH_3)CH_2O$—) units, and/or butylene oxide (—$C(CH_3)_2CH_2O$—) units, these units may alternate or may be present in the form of polyethylene oxide, polypropylene oxide, and/or polybutylene oxide blocks. Preferably, $R_2$ is a $C_1$-$C_4$ alkyl group, and more preferably $CH_3$. m can be an integer of from 8 to 50, from 10 to 45, from 12 to 40, from 15 to 35, from 18 to 35, or from 20 to 30. n can be an integer of from 0 to 5, from 0 to 3, or from 0 to 1, and preferably n is 0. Suitable commercially available alkoxylated (meth)acrylates include BISOMER S10W (methoxy polyethylene glycol 1000 methacrylate) available from GEO Specialty Chemicals UK Ltd. The oligomer may comprise, by weight based on the weight of the multi-stage polymeric particles, 0.1% or more, 0.2% or more, 0.3% or more, 0.4% or more, 0.5% or more, 0.6% or more, or even 0.7% or more, and at the same time, 5% or less, 4% or less, 3.5% or less, 3% or less, 2.5% or less, 2% or less, 1% or less, or even 0.8% or less, of structural units of the alkoxylated (meth)acrylate.

The oligomer in the multi-stage polymeric particles may further comprise (b2) structural units of one or more vinyl aromatic monomers that can be selected from the same group as described above in the polymer section above. Preferred vinyl aromatic monomer is styrene. The structural units of the vinyl aromatic monomers may be present in the polymer, the oligomer, or combinations thereof. The combined amount of the structural units of the vinyl aromatic monomers in the multi-stage polymeric particles may be 5% or more, 10% or more, 15% or more, or even 20% or more, and at the same time, 80% or less, 75% or less, or even 70% or less, by weight based on the weight of the multi-stage polymeric particles.

The oligomer in the multi-stage polymeric particles may also comprise (b3) structural units of one or more structural units of alkyl esters of (meth)acrylic acids that can be selected from the same group as described above in the polymer section above. Preferred alkyl esters of (meth) acrylic acids are selected from the group consisting of methyl methacrylate, ethyl acrylate, butyl methacrylate, butyl acrylate, and 2-ethylhexyl acrylate. The oligomer may comprise, by weight based on the weight of the multi-stage polymeric particles, from zero to 30%, from 0.01% to 30%, from 0.1% to 25%, from 0.5% to 20%, of structural units of the alkyl esters of (meth)acrylic acids.

The oligomer in the multi-stage polymeric particles may comprise (b4) structural units of one or more functional monomers that can be selected from the functional monomer mixture described above in the polymer section above. The oligomer may comprise, by weight based on the weight of the multi-stage polymeric particles, from zero to 10%, for example, 8% or less, 5% or less, 4% or less, or even 3% or less, 1% or less, or even 0.1% or less, of structural units of the functional monomer.

The polymer and/or the oligomer in the multi-stage polymeric particles useful in the present invention may also comprise structural units of one or more ethylenically unsaturated monomers carrying at least one functional group selected from acetoacetoxy, acetoacetamide, ureido, urea, sulfonate, sulfate, and carbonyl (hereinafter "additional functional monomers"). Examples of these additional monomers include 2-acrylamido-2-methylpropanesulfonic acid (AMPS), sodium salt of 3-allyloxy-2-hydroxy-1-propanesulfonic acid, sodium styrene sulfonate (SSS), sodium vinyl sulfonate (SVS); diacetone acrylamide (DAAM), acetoacetoxyethyl (meth)acrylate such as acetoacetoxyethyl methacrylate (AAEM), acetoacetoxypropyl (meth)acrylate, acetoacetoxybutyl (meth)acrylate, acetoacetamidoethyl (meth)acrylate, acetoacetamidopropyl(meth)acrylate, acetoactamidobutyl(meth)acrylate, 2,3-di(acetoacetamido)propyl (meth)acrylate, 2,3-di(acetoacetoxy) propyl (meth)acrylate, allyl acetoacetates, vinyl acetoacetates, acetoacetamides, methacrylo ethylethylene urea, Cytec CYLINK C4, SIPOMER WAM an allyl ether of a substituted urea, and SIPOMER WAM II methacrylamidoethyl ethylene urea all commercially available from Solvay Group. Preferred monomer is methacrylo ethylethylene urea. The multi-stage polymeric particles may comprise structural units of the additional functional monomer in an amount of from zero to 10%, from 0.1% to 8%, or from 0.5% to 5%, by weight based on the weight of the multi-stage polymeric particles.

The polymer and/or the oligomer in the multi-stage polymeric particles useful in the present invention may also comprise structural units of one or more additional ethylenically unsaturated nonionic monomers that are different from the monomers described above. "Nonionic monomers" refers to monomers that do not bear an ionic charge between pH=1-14. The additional ethylenically unsaturated nonionic monomers may include, for example, hydroxyethyl (meth) acrylate, hydroxypropyl (meth)acrylate, (meth)acrylonitrile, allyl methacrylate, ethyleneglycol dimethacrylate, and mixtures thereof. The multi-stage polymeric particles may comprise, by weight based on the weight of the multi-stage polymeric particles, from zero to 5%, from 0.01% to 3%, from 0.05% to 2%, or from 0.1% to 1%, of structural units of the additional ethylenically unsaturated nonionic monomers.

The multi-stage polymeric particles useful in the present invention may comprise the oligomer in an amount of 1% or more, 1.5% or more, 2% or more, 2.5% or more, 3% or more, 3.5% or more, 4% or more, 4.5% or more, or even 5% or more, and at the same time, 30% or less, 28% or less, 25% or less, 23% or less, 20% or less, 18% or less, 15% or less, 12% or less, or even 10% or less, by weight based on the weight of the multi-stage polymeric particles.

Total concentration of the structural units of monomers described above in the multi-stage polymeric particles is equal to 100%. The types and levels of the monomers described above may be chosen to provide the multi-stage polymeric particles with a Tg suitable for different applications. The multi-stage polymeric particles may have a Tg in the range of from −20 to 50° C., from −10 to 40° C., from −5 to 30° C., or from 0 to 25° C. The multi-stage polymeric particles useful in the present invention may have a number average particle size of from 50 nanometers (nm) to 500 nm, from 80 nm to 400 nm, or from 90 nm to 300 nm as determined by Brookhaven BI-90 Particle Size Analyzer. Without being bounded by a theory, the multi-stage polymer particles may comprise multiple different phases formed by the polymer and the oligomer.

The multi-stage polymeric particles useful in the present invention may have a weight average molecular weight of 100,000 g/mol or more, for example, from 100,000 to 1,000,000 g/mol, from 110,000 to 800,000 g/mol, from 120,000 to 700,000 g/mol, from 150,000 to 600,000 g/mol, or from 180,000 to 500,000 g/mol, from 200,000 to 400,000 g/mol, or from 210,000 to 380,000 g/mol, as determined by GPC analysis as described in the Examples section below.

The aqueous dispersion of the present invention further comprises water. The concentration of water may be, by weight based on the total weight of the aqueous dispersion, from 30% to 90% or from 40% to 80%. The aqueous dispersion of the present invention may be useful in many applications including, for example, wood coatings, architecture coatings, and traffic paints.

The process of preparing the aqueous dispersion of multi-stage polymeric particles may include multi-stage free-radical polymerization, preferably emulsion polymerization, in which at least two stages are formed sequentially, which usually results in the formation of multi-stage polymeric particles comprising the polymer and the oligomer, optionally the different stages can be formed in different reactors. Each of the stages is sequentially polymerized and different from the immediately proceeding and/or immediately subsequent stage by a difference in monomer composition. The multi-stage free-radical polymerization may include at least one stage forming the polymer and at least one stage forming the oligomer in the presence of a chain transfer agent, for example, forming the polymer in the first stage, followed by forming the oligomer in the second stage in the presence of the polymer formed in the presence of a chain transfer agent in the first stage and a chain transfer agent. Alternatively, the process may include forming the oligomer in the first stage, followed by forming the polymer in the second stage in the presence of the previously formed oligomer. Each stage of the free-radical polymerization can be conducted by polymerization techniques well known in the art. Total concentration of monomers for preparing the multi-stage polymeric particles is equal to 100%. A mixture of the monomers for preparing the polymer and/or the oligomer may be added neat or as an emulsion in water; or added in one or more additions or continuously, linearly or nonlinearly, over the reaction period of preparing the polymer and the oligomer, respectively, or combinations thereof. Temperature suitable for emulsion polymerization processes may be lower than 100° C., in the range of from 30 to 95° C., or in the range of from 50 to 90° C.

In the multi-stage free-radical polymerization process, free radical initiators may be used in each stage. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers used for preparing the multi-stage polymeric particles. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the multi-stage free-radical polymerization process, a surfactant may be used in each stage. The surfactant may be added prior to or during the polymerization of the monomers, or combinations thereof. A portion of the surfactant can also be added after the polymerization. Surfactants may be used for at least one stage or all stages of preparing the multi-stage polymeric particles. These surfactants may include anionic and/or nonionic emulsifiers. The surfactants can be reactive surfactants, e.g., polymerizable surfactants. Examples of suitable surfactants include alkali metal or ammonium salts of alkyl, aryl, or alkylaryl sulfates, sulfonates or phosphates; alkyl sulfonic acids; sulfosuccinate salts; fatty acids; and ethoxylated alcohols or phenols. Preferably, the alkali metal or ammonium salts of alkyl, aryl, or alkylaryl sulfates surfactant are used. The combined amount of the surfactant used is usually from 0 to 10% or from 0.5% to 3%, by weight based on the weight of total monomers used for preparing the multi-stage polymeric particles.

In the multi-stage free-radical polymerization process, a chain transfer agent may be used in each stage of polymerization, preferably in the stage of preparing the oligomer. Examples of suitable chain transfer agents include 3-mercaptopropionic acid, methyl mercaptopropionate, butyl mercaptopropionate, n-dodecyl mercaptan, benzenethiol, azelaic alkyl mercaptan, or mixtures thereof. The chain transfer agent may be used in an effective amount to control the molecular weight of the resultant oligomer or polymer. For example, in the stage of preparing the polymer, the chain transfer agent may be present in an amount of from zero to less than 0.5% (<0.5%), from 0.01% to 0.4%, from 0.02% to 0.3%, or from 0.05% to 0.2%, by weight based on the total weight of monomers used for preparing the polymer. In the stage of preparing the oligomer, the chain transfer agent may be used in an amount of from 0.5% to 5%, from 1% to 4%, from 1.5% to 3.5%, or from 2% to 3%, by weight based on the total weight of monomers used for preparing the oligomer.

In some embodiments, the process of preparing the multi-stage polymeric particles includes first preparing the polymer in an aqueous medium by a free-radical polymerization in the presence of the surfactant, followed by preparing the oligomer in an aqueous medium by a free-radical polymerization in the presence of the chain transfer agent. The pH value of the obtained multi-stage polymeric particles may be controlled to be at least 7. The obtained aqueous dispersion of multi-stage polymeric particles may be neutralized to a pH value of at least 7. Neutralization may be conducted by adding one or more bases which may lead to partial or complete neutralization of the ionic or latently ionic groups of the multi-stage polymeric particles. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The aqueous dispersion of multi-stage polymeric particles of the present invention is a stable aqueous dispersion, for example, showing no sedimentation after storage at 50° C. for 10 days or more, as determined by the test method described in the Examples section below. The aqueous dispersion is useful for use in applications where freeze-thaw stability and scrub resistance are desirable.

The present invention also relates to an aqueous coating composition comprising the aqueous dispersion of multi-stage polymeric particles described above or the aqueous dispersion of multi-stage polymeric particles obtained from the process described above. The aqueous dispersion of multi-stage polymeric particles may be present, by solids weight based on the total solid weight of the aqueous coating composition, in an amount of from 3% to 50%, from 5% to 30%, or from 8% to 20%.

The aqueous coating composition of the present invention may also comprise one or more pigments. As used herein, the term "pigment" refers to a particulate inorganic material which is capable of materially contributing to the opacity or hiding capability of a coating. Such materials typically have a refractive index greater than 1.8. Examples of suitable pigments include titanium dioxide ($TiO_2$), zinc oxide, zinc sulfide, iron oxide, barium sulfate, barium carbonate, or mixtures thereof. The aqueous coating composition may also comprise one or more extenders. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 10% to 90%, from 30% to 80%, or from 50% to 75%. PVC of a coating composition may be determined according to the following equation:

$$PVC = \frac{\text{pigment volume} + \text{extender volume}}{\text{pigment volume} + \text{extender volume} + \text{binder volume}} * 100\%$$

The aqueous coating composition of the present invention may further comprise one or more defoamers. "Defoamers" herein refers to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. The defoamer may be present, by weight based on the total weight of the aqueous coating composition, generally from 0 to 3%, from 0.1% to 2%, or from 0.2% to 1%.

The aqueous coating composition of the present invention may further comprise one or more thickeners (also known as "rheology modifiers"). The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferred thickener is based on HEUR. The thickener may be present, by weight based on the total weight of the aqueous coating composition, from 0 to 10%, from 0.1% to 6%, or from 0.2% to 4%.

The aqueous coating composition of the present invention may further comprise water. The concentration of water may be, by weight based on the total weight of the aqueous coating composition, from 5% to 90%, from 10% to 70%, or from 20% to 60%.

In addition to the components described above, the aqueous coating composition of the present invention may further comprise any one or combination of the following additives: buffers, neutralizers, dispersants, humectants, biocides, anti-skinning agents, colorants, flowing agents, anti-oxidants, plasticizers, freeze/thaw additives, leveling agents, thixotropic agents, adhesion promoters, anti-scratch additives, and grind vehicles. These additives may be present in a combined amount of, from 0 to 10%, from 0.1% to 6%, or from 0.2% to 4%, by weight based on the total weight of the aqueous coating composition.

The aqueous coating composition of the present invention has good freeze/thaw stability without compromising scrub resistance of coatings made therefrom, as compared to the same coating composition except the aqueous polymer dispersion of the present invention. Particularly, the aqueous coating composition of the present invention can pass the freeze/thaw stability test below without requiring addition of one or more conventional anti-freeze agents. The freeze/thaw stability is determined according to the test method described in the Examples section below. Specific examples of the anti-freeze agents include solvents such as ethylene glycol and propylene glycol, and high boiling point anti-freeze agents such as Rhodoline FT-100 available from Solvay, polyethylene glycol (molecular weight 400 g/mol), Strodex FT-68 available from Ashland, and mixtures thereof. The aqueous coating composition may comprise up to 2% of anti-freeze agents, for example, less than 1%, less than 0.5%, less than 0.25%, or even zero, of the anti-freeze agent, by weight based on the total weight of the aqueous coating composition. Preferably, the aqueous coating composition is substantially free of the anti-freeze agents, that is, less than 0.5% of the anti-freeze agent, by weight based on the total weight of the aqueous coating composition.

The aqueous coating composition of the present invention may be prepared with techniques known in the coating art. The process of preparing the aqueous coating composition may comprise admixing the aqueous dispersion of multi-stage polymeric particles with other optional components as described above. Components in the aqueous coating composition may be mixed in any order to provide the aqueous coating composition of the present invention. Any of the above-mentioned optional components may also be added to the composition during or prior to the mixing to form the aqueous coating composition.

The aqueous coating composition of the present invention can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition has been applied to a substrate, the aqueous coating composition may be dried, or be allowed to dry, at 5-25° C., or at an elevated temperature, for example, from 25 to 120° C. to form a film (this is, coating).

The aqueous coating composition of the present invention can be applied to, and adhered to, various substrates. Examples of suitable substrates include concrete, cementious substrates, wood, metals, stones, elastomeric substrates, glass or fabrics. The coating composition is suitable for various coating applications, such as architecture coatings, marine and protective coatings, automotive coatings, wood coatings, coil coatings, and civil engineering coatings. The aqueous coating composition can be used alone, or in combination with other coatings to form multi-layer coatings.

EXAMPLES

Some embodiments of the invention will now be described in the following Examples, wherein all parts and percentages are by weight unless otherwise specified.

Monomers and raw materials used in preparation of aqueous dispersions and their abbreviations are as follows, Butyl acrylate (BA), styrene (ST), acrylic acid (AA), phospho ethyl methacrylate, methyl acrylamide (MAM), acrylamide (AM), sodium styrene sulfonate (SSS), and sodium vinyl sulfonate (SVS).

BISOMER S10W Methoxy Polyethyleneglycol Methacrylate (MPEGMA), available from GEO Specialty Chemicals UK Ltd., is a 50% aqueous solution of methoxy polyethylene glycol 1000 methacrylate with a molecular weight of about 1080 g/mol.

SIPOMER COPS-1 ("COPS-1"), available from Solvay, is 3-allyloxy-2-hydroxy-1-propanesulfonic acid, sodium salt.

SIMMER COPS-3 ("COPS-3"), available from Solvay, is a phosphorus-containing allylic monomer.

DISPONIL FES-32 surfactant ("FES-32"), available from Cognis, is a sodium salt of fatty alcohol ether sulphate (31% solids).

The following agents are all available from Shanghai Chemical Reagent Co. Ltd.:

n-Dodecyl mercaptan (n-DDM) is used as a chain transfer agent (CTA).

Ammonium persulfate (97%) is used as an initiator.

Sodium persulfate (SPS) and tert-Butyl hydroperoxide (t-BHP) are used as initiators.

Isoascorbic acid (IAA) and Lykopon SF-PUR (Lykopon) are used as reductants.

Ferrous Sulfate ($FeSO_4$) and Ethylene diamine tetra acetic acid (EDTA) are used as promoters.

Sodium carbonate ($Na_2CO_3$) and potassium hydroxide (KOH) are used as buffers.

The following standard analytical equipment and methods are used in the Examples, Freeze-Thaw (F/T) Stability Immediately after a test paint formulation was formulated, the initial medium shear viscosity in Krebs Units (KU) of the paint formulation was measured, then let it balance overnight. On the second day, the paint formulation was put into a freezer at −7° C. for 16 hours, and then taken out from the freezer and put into an oven at 25° C. for 8 hours. The above steps complete one F/T cycle. The F/T cycles were continued to a maximum of three cycles. After the completion of the three F/T cycles, the final viscosity in KU of the paint formulation was measured. KU values were tested by a Brookfield viscosity meter according to ASTM D562-10 (2014) standard. The difference between the initial and final viscosity is reported as the viscosity change in KU (delta KU). If the sample does not coagulate or shows no grits separated from the sample after the freeze-thaw test, at the same time, shows viscosity change no more than 10 KU (≤10 KU), the sample is rated as "Pass" indicating good freeze-thaw stability. Otherwise, if the sample coagulates or has grits separated, or showing viscosity change>10 KU, the sample is rated as "Fail" indicating poor freeze-thaw stability.

Heat-age Stability Test

A test aqueous dispersion (200 g) was sealed in a 250 ml glass container. The glass container was then put in an oven at 50° C. for 10 days. After 10 days, 0.4-0.6 g of the aqueous dispersion was taken from the top layer (i.e., 1 cm down from the surface of the binder) and the bottom layer (i.e., 1 cm from the bottom of the container), respectively, and solids contents for both layers were measured. Then solids change was calculated by solids content of the bottom layer minus the solids content of the top layer. Solids change less than 0.5% (<0.5%) indicates good heat-age stability. Otherwise, solids change>0.5% indicates poor heat-age stability.

GPC Analysis

The molecular weight of a sample was measured by GPC analysis using an Agilent 1200. The sample was dissolved in 30 mL of tetrahydrofuran (THF)/formic acid (FA) (95:5 volume/volume) with a concentration of 2 mg/mL, stirred for over 1 hour and left overnight, and then filtered through 0.45 μm polytetrafluoroethylene (PTFE) filter prior to the GPC analysis. The GPC analysis was conducted using the following instrumental conditions:

Columns: One PLgel GUARD columns (10 μm, 50×7.5 mm) (132 #), two Mixed B columns (7.8×300 mm) in tandem (114 #, 115 #); column temperature: 40° C.; mobile phase: THF/FA (5%); flow rate: 1.0 mL/min; injection volume: 100 μL; detector: Agilent Refractive Index detector, 40° C.; and calibration curve: PL Polystyrene 1 Narrow standards with molecular weights ranging from 2329000 to 580 g/mol, using polynom 3 fitness.

Scrub Resistance

A paint formulation was cast with a 175 μm film caster on a black vinyl panel (Type P-121-10N, The Leneta Company), and then air dried in a horizontal position for 7 days in a Constant Temperature Room (CTR, 23±2° C. and 50±5% relative humidity). The scrub test was performed on a Sheen machine Model REF903 equipped with a metal tray and nylon bristle brush. A brush was soaked in water overnight before use, and was then mounted in a holder with the brush's bristle-side down to start the test. Ten grams of abrasive scrub medium (Type SC-2, The Leneta Company) were applied on brush surface. The number of cycles needed to completely remove the coating film in one continuous line was recorded. The number of cycles for the coating composition of Example 1 was recorded as 100%, and the number of cycles for other examples were relative percentage values compared to that of Example 1. A relative percentage higher than 85% means acceptable scrub resistance. Higher relative percentage means better scrub resistance.

Example (Ex 1)

An aqueous dispersion of Ex 1 were prepared as follows,

Firstly, a monomer mixture 1 # (ME1) was prepared by mixing 379.5 g of deionized (DI) water, 4.19 g of $Na_2CO_3$, 4.62 g of MAM, 15.56 g of AA, 38.5 g of AM (40%), 618.5 g of ST, 777 g of BA, 1.70 g of n-DDM and 54.65 g of FES-32 surfactant (31%). And a monomer mixture 2 # (ME2) was prepared by mixing 15.00 g of DI water, 23.1 g of MPEGMA (50%), 34.72 g of ST, 30.95 g of BA, 2.40 g of n-DDM and 4.97 g of FES-32 surfactant (31%).

Secondly, in a one gallon vessel equipped with a reflux condenser and a stirrer, 457.23 g of DI water was added at an agitation rate of 130 revolutions per minute (rpm). In the meanwhile, the temperature of the reaction vessel was raised to 85° C. Then 14.89 g of FES-32 surfactant (31%) and 19.25 g of COPS-3 (40%) was introduced into the reaction vessel.

Thirdly, 56.8 g of ME1, an initial reductant solution consisting of 0.0177 g of ferrous sulfate, 0.1130 g of EDTA and 6.78 g of DI water, a secondary reductant solution consisting of 0.48 g of Lykopon and 5.00 g of DI water, and an initiator solution consisting of 0.97 g of SPS, 1.46 g of $Na_2CO_3$ and 30.41 g of DI water were injected into the reaction vessel. The reaction mixture was held at a temperature between 75 and 85° C. for 5 minutes. Thereafter, the remainder of ME1 was added into the reaction vessel over the span of 170 minutes. After completing the feed of ME1, ME2 was added into the reaction vessel over the span of 20 minutes. During addition of ME1 and ME2, another shot of an initiator solution consisting of 3.25 g of SPS and 131.78 g of DI water and a reductant solution consisting of 0.81 g of IAA, 1.08 g of $Na_2CO_3$ and 131.78 g of DI water were co-fed into the reaction vessel over the span of 190 minutes. The reaction temperature was held at somewhere between 79 to 81° C. After the above mixing steps were completed, the reaction vessel was cooled down. While cooling the contents in the reaction vessel to room temperature, a reductant solution consisting of 2.80 g of IAA and 41.10 g of DI water, and an initiator solution consisting of 4.60 g of t-BHP and 37.67 g of DI water, were injected into the reaction vessel when the temperature had dropped to 70° C. Finally, an adjustable amount of KOH solution was added to the resultant dispersion to keep the pH between 7.5 and 8.5 when the temperature had reached 50° C. The multi-stage polymer particles in the obtained aqueous dispersion had a weight average molecular weight of 280,590 g/mol.

Exs 2-9 and Comparative (Comp) Exs A-P

The multi-stage polymer dispersions of Exs 2-8 and Comp Exs A-M were synthesized according to the same procedure as describe in Ex 1 above, based on monomer compositions and CTA dosage given in Table 1.

Synthesis of Oligomer Dispersion

An oligomer dispersion was prepared, according to the monomer composition for stage 2 of Ex 1.

Firstly, a monomer mixture (ME) was prepared by mixing 214.00 g of DI water, 330.00 g of MPEGMA (50%), 496.00 g of ST, 442.14 g of BA, 34.29 g of n-DDM and 71 g of FES-32 surfactant (31%).

Secondly, in a one gallon vessel equipped with a reflux condenser and a stirrer, 457.23 g of DI water was added at an agitation rate of 130 RPM. The temperature of the reaction vessel was raised to 85° C. at the same time. Then 14.89 g of FES-32 surfactant (31%) and 19.25 g of COPS-3 (40%) was introduced into the reaction vessel.

Thirdly, 56.8 g of ME, an initial reductant solution consisting of 0.0177 g of ferrous sulfate, 0.1130 g of EDTA and 6.78 g of DI water, a secondary reductant solution consisting of 0.48 g of Lykopon and 5.00 g of DI water, and an initiator solution consisting of 0.97 g of SPS, 1.46 g of $Na_2CO_3$ and 30.41 g of DI water were injected into the reaction vessel. The reaction mixture was held at a temperature between 75 and 85° C. for 5 minutes. Thereafter, the remainder of ME was added into the reaction vessel over the span of 170 minutes. During addition of ME, another shot of an initiator solution consisting of 3.25 g of SPS and 131.78 g of DI water and a reductant solution consisting of 0.81 g of IAA, 1.08 g of $Na_2CO_3$ and 131.78 g of DI water were co-fed into the reaction vessel over the span of 170 minutes. The reaction temperature was held at somewhere between 79 to 81° C. After the above mixing steps were completed, the reaction vessel was cooled down. While cooling the contents of the reaction vessel to room temperature, a reductant solution consisting of 2.80 g of IAA and 41.10 g of DI water, and an initiator solution consisting of 4.60 g of t-BHP and 37.67 g of DI water, were injected into the reaction vessel when the temperature had dropped to 70° C. Finally, an adjustable amount of KOH solution was added to the resultant dispersion to keep the pH between 7.5 and 8.5 when the temperature had reached 50° C. Thus, the oligomer dispersion was obtained and the oligomer had a weight average molecular weight of 31,164 g/mol.

TABLE 1

Compositions for preparing aqueous dispersion of multi-stage polymeric particles

| Ex | Monomer composition for stage 1$^a$ | Monomer composition for stage 2$^a$ | CTA amount stage 1$^b$/stage 2$^c$ |
|---|---|---|---|
| Ex 1 | 40ST/50.2BA/1AA/0.3MAM/1AM/0.5COPS-3 | 3.5ST/2.75BA/0.75MPEGMA | 0.12%/2.23% |
| Ex 2 | 40ST/50.2BA/1AA/0.3MAM/1AM/0.5COPS-3 | 3ST/2BA/2MPEGMA | 0.12%/2.23% |
| Ex 3 | 40ST/50.2BA/1AA/0.3MAM/1SSS/0.5COPS-3 | 3.5ST/2.75BA/0.75MPEGMA | 0.12%/2.23% |
| Ex 4 | 40ST/50.2BA/2AA/0.3MAM/0.5COPS-3 | 3.5ST/2.75BA/0.75MPEGMA | 0.12%/2.23% |
| Ex 5 | 40ST/50.2BA/1AA/1.3MAM/0.5COPS-3 | 3.5ST/2.75BA/0.75MPEGMA | 0.12%/2.23% |
| Ex 6 | 40ST/50.2BA/1AA/1.3SSS/0.5COPS-3 | 3.5ST/2.75BA/0.75MPEGMA | 0.12%/2.23% |
| Ex 7 | 39.7ST/50.2BA/1AA/0.3MAM/E3SSS/0.5COPS-3 | 3.5ST/2.75BA/0.75MPEGMA | 0.12%/2.23% |
| Ex 8 | 39.7ST/50.2BA/1AA/0.5MAM/1SSS/0.5COPS-3 | 3.5ST/2.75BA/0.75MPEGMA | 0.12%/2.23% |
| Ex 9 | 10ST/30MMA/50.2BA/1AA/1.3MAM/0.5COPS-3 | 3.5ST/2.75BA/0.75MPEGMA | 0.12%/2.23% |
| Comp Ex A | 10ST/31MMA/50.2BA/1AA/0.3MAM/0.5COPS-3 | 3.5ST/2.75BA/0.75MPEGMA | 0.12%/2.23% |
| Comp Ex B | 40ST/50.2BA/1AA/0.3MAM/1AM/0.5COPS-3 | 4.5ST/2.5BA | 0.12%/2.23% |
| Comp Ex C | 40ST/50.2BA/1AA/0.3MAM/1AM/0.5COPS-3 | 3.5ST/2.75BA/0.75MPEGMA | 0.12%/0 |
| Comp Ex D | 40ST/50.2BA/2.3AM/0.5COPS-3 | 3.5ST/2.75BA/0.75MPEGMA | 0.12%/2.23% |

TABLE 1-continued

Compositions for preparing aqueous dispersion of multi-stage polymeric particles

| Ex | Monomer composition for stage 1[a] | Monomer composition for stage 2[a] | CTA amount stage 1[b]/stage 2[c] |
|---|---|---|---|
| Comp Ex E | 40ST/50.2BA/2.3AA/0.5COPS-3 | 3.5ST2.75BA/0.75MPEGMA | 0.12%/2.23% |
| Comp Ex F | 40ST/50.2BA/2.3MAM/0.5COPS-3 | 3.5ST/2.75BA/0.75MPEGMA | 0.12%/2.23% |
| Comp Ex G | 40ST/50.2BA/2.3SSS/0.5COPS-3 | 3.5ST/2.75BA/0.75MPEGMA | 0.12%/2.23% |
| Comp Ex H | 40ST/50.2BA/1AM/1.3MAM/0.5COPS-3 | 3.5ST/2.75BA/0.75MPEGMA | 0.12%/2.23% |
| Comp Ex I | 40ST/50.2BA/1SSS/E3AM/0.5COPS-3 | 3.5ST/2.75BA/0.75MPEGMA | 0.12%/2.23% |
| Comp Ex J | 40ST/50.2BA/1AA/1.3AM/0.5COPS-3 | 3.5ST/2.75BA/0.75MPEGMA | 0.12%/2.23% |
| Comp Ex K | 40ST/50.2BA/1AA/0.3MAM/1COPS-1/0.5COPS-3 | 3.5ST/2.75BA/0.75MPEGMA | 0.12%/2.23% |
| Comp Ex L | 40ST/50.2BA/1AA/0.3MAM/1SVS/0.5COPS-3 | 3.5ST/2.75BA/0.75MPEGMA | 0.12%/2.23% |
| Comp Ex M | 40ST/50.2BA/0.3AA/2MAM/0.5COPS-3 | 3.5ST/2.75BA/0.75MPEGMA | 0.12%/2.23% |
| Comp Ex N | 40.5ST/50.2BA/1AA/0.8MAM/0.5COPS-3 | 3.5ST/2.75BA/0.75MPEGMA | 0.12%/2.23% |
| Comp Ex O | 40ST/50.2BA/1.3 AA/1AM/0.5COPS-3 | 3.5ST/2.75BA/0.75MPEGMA | 0.12%/2.23% |
| Comp Ex P | 40ST/50.2BA/1AA/E3AMPS/0.5COPS-3 | 3.5ST/2.75BA/0.75MPEGMA | 0.12%/2.23% |

[a] % by weight based on the total weight of monomers for preparing the multi-stage polymeric particles
[b] % by weight based on the total weight of monomers in stage 1
[c] % by weight based on the total weight of monomers in stage 2

TABLE 2

Physical properties of aqueous dispersions of multi-stage polymeric particles

| Examples | pH | Particle size, nm | Solids, % by weight |
|---|---|---|---|
| Ex 1 | 7.86 | 170 | 48.11 |
| Ex 2 | 8.13 | 186 | 48.17 |
| Ex 3 | 8.20 | 188 | 48.20 |
| Ex 4 | 8.04 | 195 | 48.50 |
| Ex 5 | 8.33 | 232 | 48.06 |
| Ex 6 | 8.22 | 212 | 48.28 |
| Ex 7 | 8.13 | 217 | 48.15 |
| Ex 8 | 8.26 | 241 | 47.75 |
| Ex 9 | 8.33 | 213 | 48.09 |
| Comp Ex A | 8.04 | 176 | 48.30 |
| Comp Ex B | 8.22 | 199 | 47.88 |
| Comp Ex C | 7.99 | 203 | 47.84 |
| Comp Ex D | 8.21 | 200 | 48.12 |
| Comp Ex E | 8.16 | 198 | 48.00 |
| Comp Ex F | 8.24 | 221 | 49.3 |
| Comp Ex G | 7.80 | 232 | 48.32 |
| Comp Ex H | 7.69 | 271 | 49.3 |
| Comp Ex I | 8.46 | 262 | 48.28 |
| Comp Ex J | 7.52 | 217 | 48.15 |
| Comp Ex K | 8.66 | 241 | 47.49 |
| Comp Ex L | 7.74 | 213 | 48.09 |
| Comp Ex M | 7.78 | 231 | 48.31 |
| Comp Ex N | 7.91 | 244 | 47.55 |
| Comp Ex O | 7.51 | 179 | 48.5 |
| Comp Ex P | 7.94 | 181 | 47.69 |

Paint Formulations

The paint formulations were prepared based on formulations listed in Table 3. The as prepared aqueous dispersions of multi-stage polymeric particles were used as binders for preparing each paint formulation. Ingredients for the grind were mixed. The binder was then added to the grind. Finally, other ingredients in the letdown were added to the resultant mixture and mixed for 30 minutes. The obtained paint formulations of Paints 1-9 and Paints A-P were evaluated for freeze-thaw stability and scrub resistance properties, based on the test methods described above. Results of these properties are given in Table 4.

TABLE 3

Paint formulations

| Materials | kilograms | Supplier |
|---|---|---|
| Grind | | |
| Water | 340.00 | |
| NATROSOL 250 HBR rheology modifier | 6.60 | Ashland Aquaion Company |
| AMP-95 ™ base | 1.00 | The Dow Chemical Company (AMP-95 and OROTAN are trademarks of The Dow Chemical Company) |
| OROTAN ™ 1288 dispersant | 4.60 | |

TABLE 3-continued

Paint formulations

| Materials | kilograms | Supplier |
|---|---|---|
| FOAMASTER NXZ defoamer | 1.60 | Nopco Chemicals Co. Ltd. |
| LEMON R-996 TiO$_2$ | 125.00 | Sichuan Lomon Titanium Industry Co., Ltd. |
| DB-80 extender | 130.00 | Guangfu Building Materials Group (China) |
| Talc-800 extender | 60.00 | |
| CC-700 extender | 80.00 | |
| Water | 5.00 | |
| Grind Sub-Total | 753.80 | |
| LetDown | | |
| Binder | 160.00 | |
| TERGITOL ™ 15-S-40 surfactant | 2.00 | The Dow Chemical Company |
| ROPAQUE ™ Ultra E opaque polymer | 20.00 | (TERGITOL, ROPAQUE, and COASOL are trademarks of The Dow Chemical Company) |
| COASOL ™ 290 plus coalescent | 5.00 | |
| FOAMASTER NXZ defoamer | 0.40 | Nopco Chemicals Co. Ltd. |
| Water | 58.80 | |
| Total | 1000.00 | |

* Total PVC = 67%

TABLE 4

Properties of Binders and Paints

| | Binder type and properties | | Paint Properties | |
|---|---|---|---|---|
| Paint | Binder Type | Binder solids change (50° C., 10 days), % | F/T, delta KU | Scrub resistance |
| Paint 1 | Ex 1 | 0.02 | 9.3 | 100% |
| Paint 2 | Ex 2 | 0.15 | 2.4 | NA |
| Paint 3 | Ex 3 | 0.08 | 5.1 | 86% |
| Paint 4 | Ex 4 | 0.23 | 9.7 | 89% |
| Paint 5 | Ex 5 | 0.16 | 1.5 | 78% |
| Paint 6 | Ex 6 | 0.1 | 8 | 160% |
| Paint 7 | Ex 7 | 0.11 | 8 | NA |
| Paint 8 | Ex 8 | 0.08 | 6.2 | NA |
| Paint 9 | Ex 9 | 0.43 | 3.4 | 138% |
| Paint A | Comp Ex A | 13.2 | 1.3 | 68% |
| Paint B | Comp Ex B | 0.1 | >20 | NA |
| Paint C | Comp Ex C | 0.12 | 15 | NA |
| Paint D | Comp Ex D | 11.59 | >20 | 89% |
| Paint E | Comp Ex E | 0.43 | >20 | 119% |
| Paint F | Comp Ex F | 2.02 | 3.2 | 80% |
| Paint G | Comp Ex G | 0 | 11 | 81% |
| Paint H | Comp Ex H | 0.14 | 10.8 | 87% |
| Paint I | Comp Ex I | −0.03 | >20 | 85% |
| Paint J | Comp Ex J | 0.14 | 13.8 | 176% |
| Paint K | Comp Ex K | 21.05 | 1.3 | 55% |
| Paint L | Comp Ex L | 10.81 | 5.5 | 96% |
| Paint M | Comp Ex M | 3.38 | 2.9 | 156% |
| Paint N | Comp Ex N | 10.10 | 5 | 143% |
| Paint O | Comp Ex O | 0.47 | 15.6 | 160% |
| Paint P | Comp Ex P | 15.25 | 2.4 | 136% |

As shown in Table 4, the binders of Exs 1-9 all showed good storage stability and also provided paint formulations of Paints 1-9 comprising thereof with good F/T stability without compromising scrub resistance of paints made therefrom. In addition, Exs 1-9 all demonstrated acceptable scrub resistance.

When prepared by a lower level of ST (10%) in combination of 1% AA and 0.3 MAM, the resultant binder of Comp Ex A still showed layering issue. The binders of Comp Exs B and C prepared in the absence of MEPGMA or n-DDM, respectively, provided paint formulations comprising thereof with unacceptable F/T stability. The binders of Comp Exs D, E, F, and G all prepared in the presence of a single functional monomer could not balance storage stability of the binders and the F/T stability of the paint formulations comprising thereof. The binders of Comp Exs H and I did not comprise structural units of AA and provided paint formulations comprising thereof with unacceptable F/T stability. The binders comprising different structural units of functional monomers, for example, Comp Ex K (1% AA/0.3 MAM/1 COPS-1), Comp Ex L (1% AA/0.3 MAM/1 SVS), Comp Ex M (0.3% AA/2% MAM), Comp Ex N (1% AA/0.8 MAM), and Comp Ex P (1% AA/1.3% AMPS), all showed unacceptable storage stability. The paint formulations comprising the binder of Comp Ex O (1.3% AA/1% AM as functional monomers) or the binder of Comp Ex J (1% AA/1.3% AM as functional monomers) demonstrated unacceptable F/T stability.

What is claimed is:

1. An aqueous dispersion of multi-stage polymeric particles comprising a polymer and an oligomer,
    wherein the polymer comprises,
    (a1) structural units of a functional monomer mixture, comprising,
        (i) 0.5% by weight or more of structural units of an α,β-ethylenically unsaturated carboxylic acid,
        (ii) structural units of methyl acrylamide and/or sodium styrene sulfonate, and optionally
        (iii) structural units of acrylamide;
        wherein the total amount of (i), (ii), and (iii) is 2% by weight or more;
    (a2) structural units of an alkyl ester of (meth)acrylic acid; and optionally,
    (a3) structural units of a vinyl aromatic monomer;
    wherein the oligomer has a weight average molecular weight of from 1,000 to 60,000 g/mol and comprises:
    (b1) 0.1% by weight or more of structural units of an alkoxylated (meth)acrylate having the structure of formula (I),

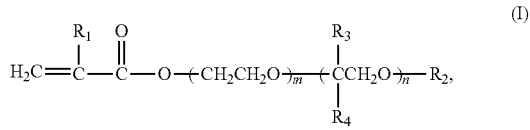

wherein $R_1$ is H or $CH_3$, $R_2$ is H or a $C_1$-$C_6$ alkyl group, $R_3$ and $R_4$ are each independently H or $CH_3$, m is an integer of from 8 to 50, and n is an integer of from 0 to 6; and optionally (b2) structural units of a vinyl aromatic monomer;

wherein the structural units of the vinyl aromatic monomer in the multi-stage polymeric particles are present in a combined amount of 5% by weight or more; and wherein the multi-stage polymeric particles comprise from 1% to 30% by weight of the oligomer; with percent by weight values relative to the weight of the multi-stage polymeric particles.

2. The aqueous dispersion of claim 1, wherein the alkoxylated (meth)acrylate has the structure of formula (I), wherein n is 0 and m is an integer of from 15 to 35.

3. The aqueous dispersion of claim 1, wherein the total amount of (i), (ii) and (iii) in the polymer is in the range of from 2.1% to 5%, by weight based on the weight of the multi-stage polymeric particles.

4. The aqueous dispersion of claim 1, wherein the polymer comprises (i) from 0.5% to 5% of structural units of the α, β-ethylenically unsaturated carboxylic acid, and (ii) from 0.1% to 5% of structural units of methyl acrylamide and/or sodium styrene sulfonate.

5. The aqueous dispersion of claim 1, wherein the polymer comprises from zero to 4% by weight of structural units of acrylamide.

6. The aqueous dispersion of claim 1, wherein the polymer further comprises structural units of a phosphorous-containing acid monomer and/or salts thereof.

7. The aqueous dispersion of claim 1, wherein the oligomer is present, based on the weight of the multi-stage polymeric particles, in an amount of from 3% to 15% by weight.

8. The aqueous dispersion of claim 1, wherein the oligomer comprises, based on the weight of the multi-stage polymeric particles, from 0.3% to 5% by weight of structural units of the alkoxylated (meth)acrylate.

9. A process of preparing an aqueous dispersion of multi-stage polymeric particles by multi-stage free-radical polymerization, comprising at least one stage forming a polymer and at least one stage forming an oligomer in the presence of a chain transfer agent;

wherein the polymer comprises, (a1) structural units of a functional monomer mixture, comprising, (i) 0.5% by weight or more of structural units of an α, β-ethylenically unsaturated carboxylic acid, (ii) structural units of methyl acrylamide and/or sodium styrene sulfonate, and optionally (iii) structural units of acrylamide;

wherein the total amount of (i), (ii), and (iii) is 2% or more;

(a2) structural units of an alkyl ester of (meth)acrylic acid; and optionally, (a3) structural units of a vinyl aromatic monomer; and wherein the oligomer has a weight average molecular weight of from 1,000 to 60,000 g/mol and comprises:

(b1) 0.1% by weight or more of structural units of an alkoxylated (meth)acrylate having the structure of formula (I),

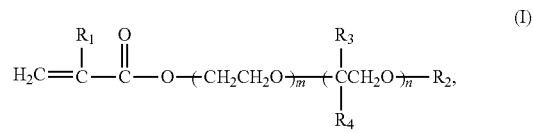

wherein $R_1$ is H or $CH_3$, $R_2$ is H or a $C_1$-$C_6$ alkyl group, $R_3$ and $R_4$ are each independently H or $CH_3$, m is an integer of from 8 to 50, and n is an integer of from 0 to 6; and optionally (b2) structural units of a vinyl aromatic monomer;

wherein the structural units of the vinyl aromatic monomer in the multi-stage polymeric particles are present in a combined amount of 5% by weight or more; and wherein the multi-stage polymeric particles comprise from 1% to 30% by weight of the oligomer; with percent by weight values relative to the weight of the multi-stage polymeric particles.

10. An aqueous coating composition comprising the aqueous dispersion of multi-stage polymeric particles of claim 1.

11. The aqueous coating composition of claim 10, being substantially free of anti-freezing agents.

* * * * *